United States Patent [19]

Willson

[11] 4,218,510

[45] Aug. 19, 1980

[54] SELF UNIFIED, HEAT SEALABLE, MULTILAYER FILM

[75] Inventor: Karl S. Willson, Woodbury, Minn.

[73] Assignee: Minnesota Mining and Manufacturing Company, St. Paul, Minn.

[21] Appl. No.: 433

[22] Filed: Jan. 2, 1979

[51] Int. Cl.[2] .................... B32B 27/34; B32B 27/32; B32B 27/36

[52] U.S. Cl. .................................. 428/349; 428/355; 428/420; 428/475; 428/476; 428/483; 428/523; 428/910

[58] Field of Search ............... 428/409, 480, 474.4, 428/475.2, 476.9, 523, 345, 349, 355, 420, 910, 482, 483

[56] References Cited

U.S. PATENT DOCUMENTS

| | | |
|---|---|---|
| 2,805,173 | 9/1957 | Ambler .......................... 428/474.4 |
| 3,188,265 | 6/1965 | Charbonneau et al. .............. 428/420 |
| 3,188,266 | 6/1965 | Charbonneau et al. ......... 428/483 X |
| 3,279,940 | 10/1966 | Francis et al. ..................... 428/483 |
| 3,423,231 | 1/1969 | Lutzmann ....................... 428/474.4 |
| 3,455,720 | 7/1969 | Davies et al. .................. 428/483 X |
| 3,547,754 | 12/1970 | Tokos et al. ................... 428/516 X |
| 3,697,368 | 10/1972 | Bhuta et al. ................... 428/523 X |
| 4,156,049 | 5/1979 | Hodes et al. ..................... 428/409 |

Primary Examiner—Harold Ansher
Attorney, Agent, or Firm—Cruzan Alexander; Donald M. Sell; James V. Lilly

[57] ABSTRACT

A self unified, heat sealable, multilayer film comprising a polyester layer chemically interfacially bonded to a polyolefinic layer containing from about 250 to 750 parts per million of a fatty acid amide, wherein the interfacial bond between said polyester layer and said polyolefinic layer is so strong that said layers cannot be mechanically separated.

25 Claims, No Drawings

SELF UNIFIED, HEAT SEALABLE, MULTILAYER FILM

BACKGROUND OF THE INVENTION

This invention relates to multilayer film structures. More particularly it relates to self unified, heat sealable multilayer film structures comprising a layer of polyester chemically interfacially bonded to a layer of a polyolefinic material containing a fatty acid amide.

Self-unified, heat sealable films have been previously described. Thus, see U.S. Pat. Nos. 3,188,265 and 3,188,266. These patents describe films which comprise a polyester layer having a polyethylene layer chemically interfacially bonded thereto. The films are prepared by laminating the two layers together and then irradiating the laminate with ultraviolet radiation to provide a bond which is mechanically inseparable. The resulting films, commercially available as SCOTCH-PAK ® films from Minnesota Mining and Manufacturing Company, have been found to be very useful especially as heat sealable packaging films for a wide variety of materials such as frozen foods, cooking oils, lubricants adhesives, tobacco, detergents and hardware.

However, the use of additives such as slip agents, has been avoided in the past in these films because it was felt that they deleteriously affected the chemical interfacial bond between the polyester and the polyethylene. The absence of slip agents in such films, however, has proven troublesome when the films are processed and converted into a package.

Slip agents are known to act as plasticizers and lubricants which reduce the resistance of films to being pulled across machine parts. This resistance, known as film surface drag, is very detrimental to high speed film processing. Consequently, the incorporation of slip agents into self unified, heat sealable films would be highly beneficial if it could be accomplished without adversely affecting the chemical interfacial bond between the polyester and the polyethylene.

It has now been discovered that certain slip agents may be incorporated into the polyethylene layer of self unified, heat sealable films in limited amounts without adversely affecting the interfacial bond even though the slip agents have a plasticizing effect upon the polyethylene layer. Still further, the addition of the slip agent does not materially affect the strength of any heat sealed bond subsequently formed.

SUMMARY OF THE INVENTION

In accordance with the present invention there is provided a self unified, heat-sealable, multilayer film structure comprising two organic film layers chemically interfacially bonded to one another, the interfacial bond being so strong that said layers cannot be mechanically separated, said organic film layers comprising a layer of biaxially oriented and heat-set polyester film and a layer of polyolefinic film having a density of less than about 0.94 g/cm³ and being transmissive to ultraviolet radiation, said polyolefinic film being selected from polyethylene and copolymers of ethylene and said layer of polyolefinic film containing from about 250 to 750 parts per million of a fatty acid amide containing at least 8 carbon atoms.

The multilayer film structures of the present invention are self unified. That is the two film layers are bonded directly to one another by a chemical interfacial bond which is so strong that the two layers cannot be mechanically separated.

This bond is produced by irradiation of the interfacial bond area by ultraviolet light thereby eliminating the need to employ a priming layer, an adhesive layer or surface treating techniques such as corona discharge.

The multilayer film structures of the present invention are also heat sealable. Thus they can be sealed on conventional heat sealing equipment to form strong heat sealed bonds.

Still further, the multilayer film structures of the invention have improved processing characteristics because of the incorporation of a fatty acid amid into the polyolefinic film layer. The fatty acid amide reduces film surface drag between the film and the processing equipment over which the film is processed. Surprisingly this effect is achieved without measurably affecting the strength of the chemical interfacial bond between the polyester film layer and the polyolefinic film layer.

DETAILED DESCRIPTION OF THE INVENTION

The polyester film layer employed in the multilayer films of the present invention is biaxially oriented and heat set. The thickness of the polyester layer is not critical to the present invention although it is preferably in the range of about 10 to 100 microns thick. Most preferably the polyester layer is about 25 microns thick.

The polyester employed may be prepared from the reaction of the appropriate dicarboxylic acid with the appropriate dialcohol or, alternatively, the acid may be converted to the corresponding ester and then allowed to react with the alcohol by ester interchange. Generally, the amount of alcohol employed is in excess of the stoichiometric amount required to react with the acid (or corresponding ester).

Representative examples of useful dicarboxylic acids include terephthalic, isophthalic, phthalic, succinic, sebacic, adipic, azelaic, suberic, pimelic and glutaric acids. Preferably the dicarboxylic acid employed is terephthalic acid. Combinations of dicarboxylic acids may be employed if desired.

The polyolefinic layer of the multilayer film structure of the present invention has a density of less than about 0.94 g/cm³ and is selected from polyethylene and copolymers of ethylene. Additionally, the polyolefinic layer is transmissive to ultraviolet radiation in the wavelength range of about 1800 to 4000 angstroms. The thickness of the polyolefinic layer is not critical to the present invention although it is preferably in the range of about 10 to 100 microns thick.

Preferably the material employed in the polyolefinic layer is selected from low and medium density polyethylenes having densities of less than about 0.925 g/cm³ and in the range of about 0.925 to 0.94 g/cm³ respectively.

Representative examples of polyethylenes useful in the polyolefinic layer include polyethylenes available from the Union Carbide Corporation as DFD 3300 (density of 0.918 g/cm³, melt index of 3.0-3.9 g/10 min); and DFD 0600 (density of 0.922 g/cm³, melt index of 0.75 g/10 min). Another example of a useful polyethylene includes type 2604M available from the Gulf Chemical Company (density of 0.934 g/cm³, melt index of 1 g/10 min).

Representative examples of copolymers of ethylene useful in the polyolefinic layer include copolymers of ethylene and acrylic acid available from the Dow Chemical Company as type 2375.12 having (density of 0.938 g/cm$^3$, melt index of 5.5 g/10 min); copolymers of ethylene and vinyl acetate available from Union Carbide Corporation as DQD 3737; metal salt copolymers of ethylene and acrylic acid such as "Surlyn-A" commercially available from E. I. duPont de Nemours and Company; and terpolymers of ethylene, methacrylic acid and vinyl acetate such as the "Elvax" acid terpolymer resins available from E. I. dupont de Nemours and Company.

The fatty acid amides useful in the present invention are solid materials which have high melting points and relatively low solubility in common solvents. They comprise a relatively long non-polar hydrocarbon chain, that is one containing at least about seven carbon atoms, which terminates with the highly polar amide group (i.e., —CONH$_2$). The hydrocarbon chain may be either saturated or unsaturated and is generally linear. The unsaturated fatty acid amides are generally more soluble in organic solvents than are the saturated fatty acid amides.

Representative examples of useful saturated fatty acid amides include caprylamide, pelargonamide, capramide, lauramide, myristamide, palmitamide, stearamide, arachidamide and behenamide.

Representative examples of useful unsaturated fatty acid amides include Δ-decylenamide, stillingamide, Δ-dodecylenamide, palmitleamide, oleamide, ricinoleamide, lineoleamide, linolenamide, arachidonamide, cotoleamide and erucamide.

Preferably the same fatty acid amide employed in the polyolefinic layer is selected from stearamide, erucamide or oleamide. Most preferably it is erucamide.

The amount of fatty acid amide employed in the polyolefinic layer may vary from about 250 parts per million (ppm) to about 750 ppm of said layer. Preferably the amount of fatty acid amide is in the range of about 250 to 500 ppm. Most preferably it is about 400 ppm of the polyolefinic layer. While levels of the fatty acid amide below about 250 ppm do reduce the resistance of the film to pull, they do not offer enough of an advantage to significantly improve the film processing characteristics. Additionally, levels of the fatty acid amide above about 750 ppm make the film too slippery and, consequently, too difficult to process.

The multilayer film structures of the present invention may be prepared by known processing techniques. Thus, the fatty acid amide may be incorporated into the polyolefinic material by itself or it may be purchased in a so called "concentrate" form which may then be combined with the polyolefinic material. The concentrate typically comprises 1% by weight of the fatty acid amide in polyethylene having a density of less than about 0.94 g/cm$^3$. A specific example of such a concentrate is Union Carbide Corporation DFDA 0291 (1% by weight erucamide in polyethylene). The polyolefinic layer, including the fatty acid amide, may then be extruded onto a previously prepared biaxially oriented and heat set polyester film support.

The resulting film is then heated to about 130° C. and exposed to ultraviolet light in the wavelength range of about 1800 to 4000 angstroms through the polyolefinic layer for a time and at an intensity sufficient to cause the formation of a chemical interfacial bond between the polyolefinic layer and the polyester layer which is so strong that the two layers cannot be mechanically separated.

The duration of heating and irradiation may be varied depending upon the light source, the distance from the source to the multilayer film and the thickness of the polyolefinic layer of the film. However, it has been found that heating and irradiating the multilayer film for about 10 seconds at a distance of from about 3 to 5 centimeters from a model G25T8, 25 watt germicidal ultraviolet light (available from the General Electric Company) provides a film structure which has an interfacial bond which is so strong that the layers cannot be mechanically separated. The process for irradiation with ultraviolet light is described in more detail in U.S. Pat. No. 3,188,266 at column 4, line 30-column 5, line 60 incorporated herein by reference.

As described hereinabove, the multilayer film structures comprise a polyolefinic film layer containing a fatty acid amide chemically interfacially bonded to one side of a polyester layer. It is also possible to chemically interfacially bond a second polyolefinic film layer to the other side of a polyester layer to produce a three layer structure comprising a polyester film layer between two polyolefinic film layers. The polyolefinic layers must each comprise a material having a density of less than about 0.94 g/cm$^3$ and be transmissive to ultraviolet light in the wavelength range of about 1800-4000 angstroms. The second polyolefinic layer may be the same or a different material as that of the first polyolefinic layer and may or may not contain the fatty acid amide utilized in the first layer.

A particularly preferred three layer structure of this type is one comprising a 25 micron thick layer of polyethylene terephthalate between two separate 25 micron thick layers of polyethylene. One of the polyethylene layers comprises a low density polyethylene and about 400 parts per million of erucamide. The other polyethylene layer comprises a medium density polyethylene and which is free from any fatty acid amide.

Three layer structures of this type may be prepared by techniques similar to those described above. However, it must be kept in mind that each of the interfacial areas between the polyester layer and the polyolefinic layer must be irradiated with ultraviolet light through the polyolefinic layer.

The present invention is further illustrated by the following examples.

EXAMPLES 1-8

A series of multilayer film structures were prepared which comprised a 25 micron thick layer of biaxially oriented and heat set polyethylene terephthalate, a first 25 micron thick layer of polyethylene having a density of 0.918 g/cm$^3$ (Union Carbide Corporation type DFD 3300) chemically interfacially bonded to one surface of the polyethylene terephalate layer, and a second 25 micron thick layer of polyethylene having a density of 0.922 g/cm$^3$ (Union Carbide Corporation type DFD 0600) chemically interfacially bonded to the other surface of the polyethylene terephthalate layer. The first polyethylene layer contained from 0 to 750 parts per million of erucamide.

The general procedure employed to prepare the film structures was as follows. The first and second layers of polyethylene were extrusion coated onto separate surfaces of the layer of polyester film. The interfacial areas of the resultant film structures were then heated to a temperature of about 130° C. and then sequentially irradiated through each polyethylene layer to ultraviolet light from a model G25T8, 25 watt germicidal bulb available from General Electric Company. The interfacial areas were irradiated for about 10 seconds at a distance of about 4 centimeters. The resultant film structures were self-unified and heat sealable. The films were tested for heat seal strength and surface resistance to pull.

The erucamide, when employed, was incorporated into the first polyethylene layers by blending the desired amount of Union Carbide Corporation DFDA 0291 (a polyethylene having a density of 0.922 g/cm$^3$ and containing 1% by weight erucamide) with the first polyethylene and extruding the blend onto the polyethylene terephthalate as the first polyethylene layer.

The heat seal strength was measured as follows. Each film structure was heat sealed for 1 sec. at 177° C. and 2.7 atmospheres (gauge) with the first polyethylene layer being heat sealed to itself. The sealed films were then cut into 2.5 cm widths and the heat sealed bonds pulled apart by an Instron Tensile Tester, Model TM operating at a jaw separation speed of 12.5 cm/min. Each of the jaws was attached to a separate side of heat sealed bond. The force necessary to separate the heat sealed bond was recorded.

The surface resistance to pull was measured as follows. An 11 cm wide strip of each of the film structures was pulled across the forming head of a Model 42-2 Kartridg Pak packaging machine with the first polyethylene layer contacting the forming head. An Instron Tensile Tester, Model TM operating at a jaw separation speed of 25 cm/min. was used to pull the composite films across the forming head and to measure the resistance to pull.

The heat seal strength and the surface resistance to pull for each of the films are set forth below

| Example | Erucamide (Part per Million) | Heat Seal Strength (kg.) | Resistance to Pull (kg.) |
|---|---|---|---|
| 1 | 0 | 3.3 | 8.3 |
| 2 | 150 | 3.1 | 5.4 |
| 3 | 250 | 2.6 | 4.4 |
| 4 | 350 | 2.8 | 4.0 |
| 5 | 400 | 2.9 | 3.2 |
| 6 | 500 | 3.0 | 2.7 |
| 7 | 600 | 2.9 | 2.6 |
| 8 | 750 | 3.1 | 2.5 |

As can be seen the addition of the erucamide does not materially effect the heal strength but does dramatically affect the resistance to pull. At a level of 150 ppm, the resistance, while reduced, is still too great to result in significant improvement in the processing characteristics of the film. At a level of 250 ppm the effect of the erucamide significantly improves the processing characteristics of the film. Above a level of 750 parts per million, the film becomes too slippery to efficiently process.

What is claimed is:

1. A self-unified, heat-sealable, multilayer film structure comprising two organic film layers chemically interfacially bonded to one another, the interfacial bond being so strong that said layers cannot be mechanically separated, said organic film layers comprising
   a layer of biaxially oriented and heat-set polyester film and
   a layer of polyolefinic film having a density of less than about 0.94 g/cm$^3$ and being transmissive to ultraviolet radiation, said polyolefinic film being selected from polyethylene and copolymers of ethylene, and said layer of polyolefinic film containing from about 250 to 750 parts per million of a fatty acid amide containing at least 8 carbon atoms.

2. A self-unified, heat-sealable multilayer film structure according to claim 1 wherein said fatty acid amide is an unsaturated fatty acid amide.

3. A self-unified, heat-sealable multilayer film structure according to claim 2 wherein said unsaturated fatty acid amide is selected from oleamide and erucamide.

4. A self-unified, heat-sealable multilayer film structure according to claim 3 wherein said unsaturated fatty acid amide is erucamide.

5. A self-unified, heat-sealable multilayer film structure according to claim 3 wherein said unsaturated fatty acid is oleamide.

6. A self-unified, heat-sealable multilayer film structure according to claim 1 wherein said fatty acid amide is saturated.

7. A self-unified, heat-sealable multilayer film structure according to claim 6 wherein said saturated fatty acid amide is stearamide.

8. A self-unified, heat-sealable multilayer film structure according to claim 1 wherein said polyolefinic film is polyethylene.

9. A self-unified, heat-sealable multilayer film structure according to claim 1 wherein said polyolefinic film is a copolymer of ethylene.

10. A self-unified, heat-sealable multilayer film structure according to claim 9 wherein said copolymer of ethylene is selected from copolymers of ethylene and (1) acrylic acid, (2) ethyl acrylate, (3) vinyl acetate and (4) methacrylic acid and vinyl acetate.

11. A self-unified, heat-sealable multilayer film structure according to claim 1 wherein said polyolefinic layer comprises (i) polyethylene having a density of less than about 0.94 g/cm$^3$ and (ii) from about 250 to 500 parts per million of erucamide.

12. A self-unified, heat-sealable multilayer film structure according to claim 11 wherein said polyethylene has a density of less than about 0.925 g/cm$^3$.

13. A self-unified, heat-sealable multilayer film structure according to claim 12 containing about 400 parts per million of erucamide.

14. A self-unified, heat-sealable, multilayer film structure comprising a layer of biaxially oriented and heat-set polyester film, a first and a second layer of polyolefinic film chemically interfacially bonded to opposite sides of said layer of polyester film, the interfacial bond being so strong that said layers cannot be mechanically separated,
   wherein said first and second layers of polyolefinic film have a density of less than about 0.94 g/cm$^3$, are transmissive to ultraviolet radiation and are selected from polyethylene and copolymers of ethylene, and
   wherein said first layer of polyolefinic film further contains from about 250 to 750 parts per million of a fatty acid amide containing at least 8 carbon atoms.

15. A self-unified, heat-sealable, multilayer film structure according to claim 14 wherein said first layer of polyolefinic film comprises polyethylene having a density of less than about 0.925 g/cm$^3$.

16. A self-unified, heat-sealable multilayer film structure according to claim 15 wherein said second layer of polyolefinic film comprises polyethylene having a density in the range of about 0.925 to 0.94 g/cm³.

17. A self-unified, heat-sealable multilayer film structure according to claim 16 wherein said first layer of polyolefinic film contains from about 250 to 500 parts per million of fatty acid amide.

18. A self-unified, heat-sealable multilayer film structure according to claim 17 wherein said fatty acid amide is unsaturated.

19. A self-unified, heat-sealable multilayer film structure according to claim 18 wherein said unsaturated fatty acid amide is selected from oleamide and erucamide.

20. A self-unified, heat-sealable multilayer film structure according to claim 19 wherein said unsaturated fatty acid amide is erucamide.

21. A self-unified, heat-sealable multilayer film structure according to claim 19 wherein said unsaturated fatty acid amide is oleamide.

22. A self-unified, heat-sealable multilayer film structure according to claim 20 containing about 400 parts per million of erucamide.

23. A self-unified, heat-sealable multilayer film structure according to claim 22 wherein said second layer of polyolefinic film is free from fatty acid amide.

24. A self-unified, heat-sealable multilayer film structure according to claim 17 wherein said fatty acid amide is saturated.

25. A self-unified, heat-sealable multilayer film structure according to claim 24 wherein said saturated fatty acid is stearamide.

* * * * *